United States Patent [19]
Arrighetti et al.

[11] 3,903,062

[45] Sept. 2, 1975

[54] OLEFIN TETRAPOLYMER AND PROCESS FOR THE PREPARATION THEREOF

[75] Inventors: Sergio Arrighetti, Milan; Sebastiano Cesca, San Donato Milanese; Giuseppe Ghetti, San Donato Milanese; Mario Bruzzone, San Donato Milanese; Ermanno Cinelli, San Donato Milanese, all of Italy

[73] Assignee: Snam Progetti S.p.A., San Donato Milanese, Italy

[22] Filed: Aug. 8, 1973

[21] Appl. No.: 369,184

[52] U.S. Cl. ............................ 260/80.78; 260/79.5
[51] Int. Cl. ......... C08f 1/34; C08f 1/08; C08f 3/16
[58] Field of Search ................................ 260/80.78

[56] References Cited
UNITED STATES PATENTS
3,464,959   9/1969   Marconi et al. .................... 260/79.5
3,470,138   9/1969   Marconi et al. .................. 260/80.78

OTHER PUBLICATIONS

De Kock and Veermans, Rubber Chemistry and Technology, 1967, 40, pp. 563–568.

*Primary Examiner*—Joseph L. Schofer
*Assistant Examiner*—A. L. Clingman
*Attorney, Agent, or Firm*—Ralph M. Watson, Esq.

[57] ABSTRACT

Vulcanizable olefin tetrapolymers are described which are comprised of ethylene, an alpha-olefin having at least 3 carbon atoms, at least one conventional terpolymer such as exo-dicyclopentadiene, and a minor amount of a polycyclic polyene containing an endomethylene system ortho-condensed with another hydrocarbon ring, and wherein the two carbon atoms common to two rings belong to a conjugated diene system whose double bonds are in the ring other than the endomethylene ring.

12 Claims, No Drawings

OLEFIN TETRAPOLYMER AND PROCESS FOR THE PREPARATION THEREOF

The present invention relates to novel olefine tetrapolymers constitutes by ethylene, an alphaolefin, one or more termonomers generally employed in the synthesis of terpolymers and a lesser amount of a polyene containing at least two conjugated double bonds and at least one norbornene ring.

It is known that it is possible to produce olefin terpolymers which contain in their molecule double bonds which are available for the subsequent vulcanization with usual agents generally containing sulphur.

However it is also known that the vulcanization rate of these terpolymers is rather low when compared with that of the diene elastomers, as, for instance natural rubber, polyisoprene, polybutadiene, butadiene-styrene and butadiene-isoprene copolymers, and the like, and such a negative characteristic has till now remarkably hindered the utilization of these terpolymers mixed with diene elastomers.

The availability of co-vulcanizable mixes constituted by a terpolymer having a low unsaturation degree and a diene polymer or copolymer would be very important in the tire industry because the presence of a polymer at a low unsaturation degree increases the stability of the manufactured article against ageing and oxidizing agents.

For this purpose it has been proposed to produce terpolymers containing high concentrations of usual termonomers up to 18%. However, without taking into account the complications of the polymerization process (high catalyst consumption and reagent loss owing to secondary reactions) terpolymers are obtained showing in general poor mechanical properties, owing to the high glass transition point of the obtained elastomer and furthermore the peculiar characteristics of the elastomers of low unsaturation are decreased as against resistance to ageing and to oxidising agents.

In order to avoid the aforesaid drawbacks, the assignee of this application, in Italian Patent No. 843,706, proposed particular terpolymers having, as comonomers besides ethylene and propylene or an alphaolefin, a polycyclic polyene containing an endomethylene system ortho-condensed with another hydrocarbon ring, wherein the two carbon atoms common to two rings belong to a conjugated diene system whose double bonds are in the ring other than the endomethylenic one.

These terpolymers show very good characteristics as to the vulcanization rate and the co-vulcanization with diene elastomers also at low values of the concentration of the polyene termonomer. However the cost of these termonomers is higher than that of the usual termonomers such as dicyclopentadiene, 1,4-hexadiene, cyclooctadiene, tetraidroindene, vinylcyclohexene, and so on, which may be easily prepared from starting compounds which are easily available.

It has now been surprisingly found that if a copolymerization is performed among ethylene, an alpha-olefin having at least 3 carbon atoms, a termonomer usually employed in the preparation of terpolymers in the presence of small amounts of a polycyclic polyene as aforesaid, a polymer is obtained showing both the advantages of the very good characteristics of vulcanization and covulcanization rate with diene elastomer and that of the low cost of the usual termonomers, and the obtained copolymers retain the characteristics of the elastomers having a low unsaturation with respect to resistance to ageing and oxidizing agents and the glass transition temperature.

This fact is the more unexpected since, if terpolymers are prepared containing an amount of usual termonomers equal to or higher than the sum of the inventive termonomers, the same results are not obtained as to the high vulcanization and covulcanization rate with diene elastomers.

Also the employment of mixes constituted by different terpolymers the former containing an usual termonomer and the latter a polycyclic polyene as aforesaid, does not give the characteristics of the tetrapolymer according to the invention.

Therefore the first subject of the present invention consists of a tetrapolymer showing both the good characteristics of the elastomers having a low unsaturation degree as the usual terpolymers and able to give rise to mixes covulcanizable with rubbers having a high unsaturation.

The second subject of the present invention is constituted by the covulcanizable mixes between a tetrapolymer as aforesaid and an usual unsaturated rubber as natural rubber, polybutadiene, polyisoprene, butadiene-isoprene, butadieneacrylonitrile and butadiene-styrene copolymers.

Among the so-called commercial termonomers the following may be cited: exo- and endo-dicyclopentadiene, alkenyl- or cycloalkenyl-norbonenes, alkyliden-norbornenes, alkyl-norbornadienes, tetraidrondene and alkyl-derivatives thereof, methyl-endomethylenehexahydronaphtalene, dicycloheptadiene, linear or branched dienes non-conjugated as 1,4-hexadiene, 1,4-heptadiene, 1,6-octadiene, 11-methyl-dodecadiene-1,10, cyclic dienes as 1,5-cyclooctadiene, 2-methyl-1,5-cyclooctadiene, cyclopentadiene-1,4, vinyl substituted cyclic hydrocarbons as vinyl-cyclohexene, vinyl cyclopentene, dipentene, divinyl benzene, trivinyl cyclohexane.

As polycyclic polyenes containing an endomethylene system with a double bond orthocondensed with another hydrocarbon ring containing two conjugated double bonds we may cite the following ones:

A — dehydrodicyclopentadiene or 4,7-endomethylene-4,7-dihydroindene
B — 5,8-endomethylene-2,3,5,8-tetrahydronaphtalene
C — 2,3-dimethyl-5,8-endomethylene-2,3,5,8-tetrahydronaphtalene
D — 2,4-dimethyl-4,7-endomethylene-4,7-dihydroindene
E — 1,3-dimethyl-4,7-endomethylene-4,7-dihydroindene
F — 1-methyl-4,7-endomethylene-4,7-dihydroindene
G — 1,2,3,4-tetramethyl-4,7-endomethylene-4,7-dihydroindene
H — 1,4-dimethyl-5,8-endomethylene-2,3,5,8-tetrahydronaphtalene
J — 2-methyl-4,7-endometylene-4,7-dihydroindene
K — 1,2-dimethyl-4,7-endomethylene-4,7-dihydroindene
L — 1,2,3-trimethyl-4,7-endomethylene-4,7-dihydroindene
M — 2,2-dimethyl-4,7-endomethylene-4,7-dihydroindene
N — 1,2,2,3-tetramethyl-4,7-endomethylene-4,7-dihydroindene.

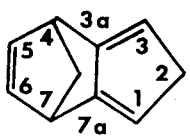 A
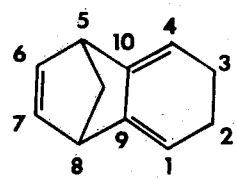 B
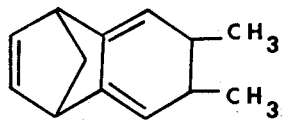 C
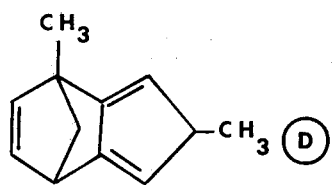 D
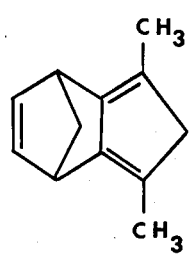 E
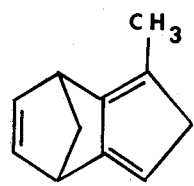 F
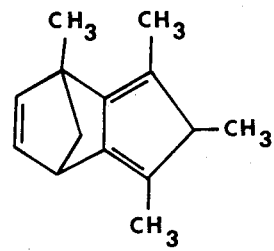 G
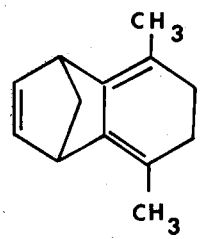 H
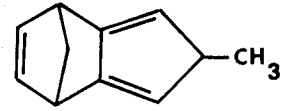 J
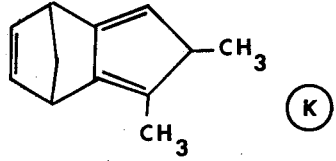 K
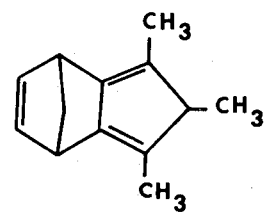 L
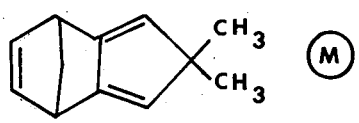 M
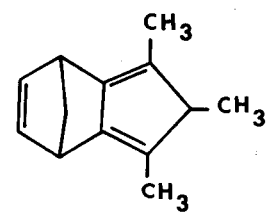 N The amount of the termonomer of the conventional type which may be usefully employed according to the invention ranges from 1 to 10%, and preferably from 3 to 7% by weight.

The amount of polycyclic polyene containing an endomethylene system with a double bond orthocondensed with another hydrocarbon ring containing two conjugated double bonds may range between 0.1 and 2%, preferably between 0.4 and 1.5% by weight.

The catalyst systems useful for obtaining the inventive tetrapolymers can be constituted by a compound of a transition metal of from the fourth to eighth groups of the periodic system and by reducing aluminum compounds having the general formula $Al\ R\ X_1\ X_2$ wherein R is selected from hydrocarbon radicals having from 1 to 10 carbon atoms and hydrogen; $X_1$ and $X_2$ the same or different, are selected from the same class as R or may be halogen, secondary amine radicals, and furthermore the aluminum compound may be a polyiminoalane as described in the Italian Patent No. 778,353 and the corresponding U.S. Pat. No. 3,470,138.

The polymerization reaction may be carried out in the presence of an inert hydrocarbon solvent or of the same monomers (alpha-olefins) kept in the liquid state.

The catalyst may be preformed in the presence or the absence of one of the monomers or may be formed in situ.

The temperatures are the ones usually employed in these types of reactions or may range from $-60°$ to $+100°C$.

The employed pressures range from the one necessary for maintaining, at least partially, the monomers in the liquid phase and 100 atm., preferably between 1 and 80 atmospheres.

The inventive tetrapolymers may be mixed with diene rubbers having a high unsaturation degree and the so obtained mixes may be vulcanized by employing the usual vulcanization ingredients.

The respective amounts of tetrapolymer and diene rubber at high unsaturation degree can vary over a wide range, practically from 3 to 80% of tetrapolymer.

These mixes show very good mechanical characteristics and, after the vulcanization, can be advantageously utilized in the tire industry and as "general purpose" rubbers.

The following unrestrictive examples illustrate the invention, which however are not limitative thereof.

EXAMPLE 1

2.5 liters of anhydrous toluene, distilled on LiH, were introduced under an inert atmosphere into a 3 liters reactor, provided with effective mechanical stirrer, thermometer, and gas inlet and outlet pipes, which had previously been dried. At the temperature of 0°C the solvent was saturated by an ethylenepropylene stream, in a $C_3H_6/C_2H_4$ molar ratio equal to 1.8, flowing at the rate per hour of 1100 liters as measured under normal conditions (25°C and 1 atmosphere). Under effective stirring, while the olefin stream was flowing, $cm^3$ 2.0 of "endo" dicyclopentadiene (I), corresponding to 14.8 mmoles, were introduced into the reactor, together with 3.0 mmoles of dehydro-dicyclopentadiene (II), corresponding to 0.39 g and dissolved in 5 $cm^3$ of toluene; then 0.5 mmole of vanadium triacetyl acetonate and 4.0 mmoles of $Al\ Et_2\ Cl$ were introduced into the reactor. The polymerization started at once while the stream of the gaseous monomer was going to flow.

During the reaction, minute by minute, such amounts of (I) and (II) were again introduced that the sum thereof was 9.5 mmoles of (II), and 37.1 mmoles of (I) together with 1.2 mmoles of anhydrous pyridine: all compounds were dissolved in toluene and introduced into the reactor at the same time, but portion by portion.

The polymerization reaction was stopped after 20 minutes by adding 10 $cm^3$ of n-butylalcohol; the polymer solution was made free from the catalyst residuals by washing with an excess of deionized water containing 0.1% of an emulsifying agent.

The obtained emulsion was broken by adjusting the pH to 5 by means of $CH_3COOH$; the aqueous phase was separated and the polymer solution was treated with an excess of an aqueous solution, at pH = 5, of disodium salt of ethylenediaminotetraacetic acid. We still washed with deionized water up to neutral pH.

The produced polymer was recovered by coagulating the toluene solution in an excess of acetone containing 0.10% of phenolic antioxidant. The polymer mass was again dissolved in n-heptane and the polymer was again precipitated as aforesaid. After drying at room temperature, under vacuum, for 15 hours, g 85 were obtained of a dry polymer, having a white colour and the shape of an unvulcanized elastomer which, at analysis, showed the following properties:

% by weight of $C_2H_4$ = 62 (determined by UV spectrophotometric analysis at 242 m$\mu$)
% by weight of (II) = 0.55
% by weight of (I) = 4.3 (determined by iodometric way through IBr absorption and taking into account the (II) amount)
[$\mu$] in toluene at 30° C = 2.07 dl/g
Mooney viscosity, $ML_{1+4}$ (100°C) = 98

The tetrapolymer nature of the produced elastomer was confirmed by the following fractionation carried out in a Kumagawa extractor by means of three different solvents:

|  | % | [$\mu$] | %(I) | %(II) | %$C_2H_4$ |
| --- | --- | --- | --- | --- | --- |
| raw polymer | 100 | 2.07 | 4.3 | 0.55 | 62 |
| ether extract | 12.7 | 0.91 | 3.8 | 0.38 | 56 |
| n-pentane extract | 29.7 | 1.88 | 4.5 | 0.60 | 61 |
| n-hexane extract | 57.6 | 2.15 | 4.5 | 0.55 | 62 |
| residue | 0 | — | — | — | — |

Two shares of the produce terpolymer were mixed with the vulcanization ingredients of the following table:

| | | |
| --- | --- | --- |
| -polymer | 100 | parts |
| -HAF black | 50 | " |
| -naphtenic oil | 5 | " |
| -Zn oxide | 5 | " |
| -stearic acid | 1 | " |
| -vulkacit CZC | 1 | " |
| -sulphur | 1.7 | " |
| -AO-2246 | 1 | " |

Vulcanization temperature = 145°C

The first mix contained, besides the vulcanization ingredients, only tetrapolymer while the second one consisted of 75% tetrapolymer and 25% polyisoprene.

The results of the technological measurements performed on homovulcanized samples are reported in the section 1 (sample A), while the results of the covulcanization tests are reported in section 2 (sample A).

Both the measurement series of the sections 1 and 2 emphasize that the properties of the produced tetrapolymer are quite superior to the ones of a terpolymer (sample B) containing 5% by weight of endo dicyclopentadiene, having $ML_{1+4}$ (100°C) = 68 and $C_2H_4$ = 54%.

Also comparing the sample A of the sections 1 and 2 with a mixture at 50% of terpolymers totally containing 5.2% of (I) and 0.58% of (II) (sample C) emphasizes that the elastomer produced according to the aforesaid example is a true tetrapolymer and the properties shown from the vulcanized products obtained thereby cannot be obtained by mixing two terpolymers containing the termonomers which are contemporaneously present in the tetrapolymer.

EXAMPLE 2

The preceding example was repeated but use was made of "exo"-dicyclopentadiene (III) instead of the endo-stereoisomer; 10.0 mmoles thereof were employed in the reactor charging phase and 30.0 mmoles during the polymerization time: all other components of the reaction system and respective amounts were unchanged.

After 20 minutes reacting g 98 of dry elastomer were obtained showing the following properties:

| | |
|---|---|
| % $C_2H_4$ | = 60 |
| % (II) | = 0.51 |
| % (III) | = 4.9 |
| $[\mu]$ | = 1.89 dl/g |
| $ML_{1+4}$ (100°C) | = 84 |

The elastomer was vulcanized and co-vulcanized with polyisoprene according to the recipe and the conditions of example 1, and the results reported respectively in sections 1 and 2 were obtained (sample D). The collected results showed the properties of the tetrapolymer to be better not only than the ones of a (I) base terpolymer (sample B of the sections 1 and 2), but also than the ones of a (II) base terpolymer (sample E) containing 0.65% of (III), $C_2H_4$ = 61% and $ML_{1+4}$ (100°C) = 81.

EXAMPLE 3

According to example 1, 25.0 mmoles of 1,4-hexadiene (IV) (2.93 cm³), 30 mmoles (0.39 g) of (II), together with 0.75 mmole of vanadium triacetylacetonate and 7.5 mmoles of Al Et₂ Cl were introduced into the reactor. The polymerization was carried out at −10°C, by adding over the reaction time 50.0 mmoles of (IV), 9.0 mmoles of (II) and 2.5 mmoles of anhydrous pyridine.

After 20 minutes of reaction 79 g of dry polymer were obtained showing the following properties:

| | |
|---|---|
| % $C_2H_4$ | = 63 |
| % (II) | = 0.51 |
| % (IV) | = 3.1 |
| $[\mu]$ | = 1.84 dl/g |
| $Ml_{1+4}$ (100°C) | = 80 |

The technological properties obtained from the vulcanized and co-vulcanized samples are reported in the sections 1 and 2 (sample F) and are favorably compared with the properties of a terpolymer containing 4.2% of (IV) (sample G).

EXAMPLE 4

Use was made of the usual procedure described in example 1 and 50.0 mmoles of 4-vinyl-cyclohexene-1 (V) (6.48 cm³), 3.0 mmoles of (II) (0.39 g) together with 0.80 mmole of vanadium triacetyl acetonate and 8.0 mmole of Al Et₂ Cl were employed. We worked at 0°C and added, over 30 minutes of polymerization, other 100 mmoles of (V), 9.0 mmoles of (II) and 2.5 mmoles of anhydrous pyridine. At the end 84 g of dry polymer were obtained showing the following properties:

| | |
|---|---|
| % $C_2H_4$ | = 66 |
| % (II) | = 0.59 |
| % (V) | + 3.7 |
| $ML_{1+4}$ (100°C) | = 78 |
| $[\mu]$ | = 1.83 dl/g |

The technological properties of the tetrapolymer vulcanized and, above all; of the ones covulcanized with polyisoprene were very good (sample H) where compared with the properties resulting from mixtures containing polyisoprene and (II) base terpolymers (sample E) or (V) base terpolymers (sample I), having termonomer amounts close to the ones found in the aforesaid tetrapolymer [sample I contained 41% of (V)].

EXAMPLE 5

We operated substantially according to example 1 by introducing 3.0 mmoles of (II), corresponding to 0.39 g, dissolved in 5 cm³ of toluene and 0.244 mole of 1,5-cyclooctadiene (VI), corresponding to 30 cm³, into the reactor.

0.95 mmole of vanadium triacetylacetonate, 9.5 mmoles of Al Et₂ Cl were also introduced into the reactor: 3.3 mmoles of anhydrous pyridine were added over 20 minutes reaction together with 9.0 mmoles of (II) and 0,537 mole of (VI).

The polymer was recovered as aforesaid after having removed catalyst residuals and the unreacted (II) and (VI) amounts.

63 g of dry elastomer were obtained which, at analysis, showed the following properties:

| | |
|---|---|
| % $C_2H_4$ | = 60 |
| % (II) | = 0.58 |
| % (VI) | = 4.5 |
| $[\mu]$ | = 1.68 dl/g |
| $ML_{1+4}$ (100°C) | = 60 |

When subjected to vulcanization and covulcanization with polyisoprene according to the recipe of example 1, the obtained tetrapolymer gave the results reported, respectively, in sections 1 and 2 (sample L). The highest properties of the tetrapolymer were confirmed by comparing the results obtained from a (V) base terpolymer and containing 5.10% of this diolefine (sample M).

EXAMPLE 6

The example 1 was repeated but (II) was replaced by its higher homologous, i.e., 1 or 2-methyl-dehydrodicyclopentadiene (VII). By employing the same amounts of catalyst and monomers, we obtained, at −10°C and over 30 minutes, a dry polymer yield of 101 g, having the following properties:

```
% C₂H₄           = 59
% (I)            = 4.4
% (VII)          + 0.75
[μ]              = 1.82 dl/g
ML₁₊₄ (100°C)    = 81
```

The properties of the vulcanized and co-vulcanized products obtained starting from the tetrapolymer prepared according this example were slightly higher than the ones of sample D reported in the sections 1 and 2.

EXAMPLE 7

We repeated example 1 but replaced (I) with a mixture of hexo and endo isomers of dicyclopentadiene, containing 70% of hexo derivative, the other being unchanged.

After 20 minutes we obtained 81 g of dry elastomer showing the following properties:

```
% C₂H₄                             = 60
% (II)                             = 0.53
% of endo and exo dicyclopentadiene = 5.1
[μ]                                = 1.93 dl/g
ML₁₊₄ (100°C)                      = 85
```

The behaviour of the obtained elastomer, after vulcanization according to the recipe of example 1, was very similar to the one of sample D reported in sections 1 and 2.

EXAMPLE 8

The example 1 was repeated by using the same reagent amounts but compound (I) which was replaced by a mixture of products obtained from the condensation of butadiene with cyclopentadiene at the temperature of 170°C and constituted by 8% of endo dicyclopentadiene, 28% of 4,5,8,9-tetrahydroindene, 54% of 4-vinyl-cyclohexene-1. After 20 minutes reaction 63 g of dry elastomers were obtained showing the following properties:

```
% C₂H₄                                          = 66
% (II)                                          = 0.51
% of dimers of butadiene, cyclopentadiene and mixed
    adducts                                     = 3.5
[μ]                                             = 1.54 dl/g
ML₁₊₄ (100°C)                                   = 45
```

The elastomer behaviour after vulcanization and co-vulcanization was satisfactory and, at any rate, better than that of the vulcanized products obtained from polymers constituted by only (II) or mixture of dienes resulting from the condensation of butadiene with cyclopentadiene.

What we claim is:

1. Vulcanizable olefin tetrapolymers comprising ethylene, an alpha-olefin having at least 3 carbon atoms, one or more termonomers selected from the group consisting of exo- and endo-dicyclopentadiene, alkenyl- and cyclo-alkenylnorbornenes, alkyliden-norbornenes, alkyl-norbornadienes, tetrahydroindene and alkyl derivatives thereof, methyl-endomethylenehexahydronaphthalene, dicyloheptadiene, linear and branched nonconjugated dienes, cyclic dienes and vinyl substituted cyclic hydrocarbons and a minor amount of a polycyclic polyene containing an endomethylene system ortho-condensed with another hydrocarbon ring, and wherein the two carbon atoms common to two rings belong to a conjugated diene system whose double bonds are in the ring other than the endomethylene one.

2. Tetrapolymers according to claim 1 wherein the amount of said polycyclic polyene in the elastomer ranges from 0.1 to 2% by weight.

3. Tetrapolymers according to claim 1, wherein the amount of said termonomers ranges between 1 and 10% by weight.

4. Tetrapolymers according to claim 1 wherein said polycyclic polyene is dehydrodicyclopentadiene.

5. Tetrapolymers according to claim 1 wherein said polycyclic polyene is methyldehydrodicyclopentadiene.

6. Tetrapolymers according to claim 1 wherein said alpha-olefin is propylene.

7. Tetrapolymers according to claim 1 wherein said termonomer is selected from endo-dicyclopentadiene, exo-dicyclopentadiene, 1,4-hexadiene, 4-vinylcyclohexene, cyclooctadiene, methyltetrahydroindene.

8. Process for the production of tetrapolymers according to claim 1, wherein use is made of a catalytic system comprising:
   A. a compound of a transition metal belonging to the fourth to eighth groups of the periodic system,
   B. a reducing aluminum compound.

9. Process according to claim 8 wherein the aluminum reducing compound has the general formula R Al X₁X₂ wherein R is hydrogen or an alkyl radical having from 1 to 10 carbon atoms: X₁ and X₂, the same or different, are selected from the same group as R or may be halogen or secondary amine radicals.

10. Process according to claim 8 wherein the aluminum reducing compound is a polyiminoalane.

11. Process according to claim 8, wherein the reaction is carried out at temperatures ranging from −60° to +100°C and at pressures ranging from 1 to 80 atmospheres.

12. Manufactured articles obtained by vulcanizing the tetrapolymers according to claim 1.

* * * * *

UNITED STATES PATENT AND TRADEMARK OFFICE
CERTIFICATE OF CORRECTION

PATENT NO. : 3,903,062
DATED : September 2, 1975
INVENTOR(S) : Sergio Arrighetti, et al It is certified that error appears in the above-identified patent and that said Letters Patent are hereby corrected as shown below:

Col. 6, line 28, delete "(determined by UV spectrophotometric";

line 29, after "0.55" insert -- (determined by UV spectrophotometric --;

line 33, correct "[μ]" to read -- [η] --;

line 43, correct the heading of the second column from "[μ]" to read -- [η] --.

Col. 7, lines 32 and 61, correct "[μ]" to read -- [η] --.

Col. 8, lines 18 and 49, correct "[μ]" to read -- [η] --.

Col. 9, line 5, correct "[μ]" to read -- [η] --;

lines 14 and 15, correct "hexo" to read -- exo --;

lines 24 and 45, correct "[μ]" to read -- [η] --;

after line 53, insert the following two tables, entitled, respectively, "Section 1" and "Section 2":

UNITED STATES PATENT AND TRADEMARK OFFICE
CERTIFICATE OF CORRECTION

PATENT NO. : 3,903,062
DATED : September 2, 1975
INVENTOR(S) : Sergio Arrighetti, et al It is certified that error appears in the above–identified patent and that said Letters Patent are hereby corrected as shown below:

SECTION 1

Technological properties of homo-vulcanized products obtained from tetrapolymers or terpolymers as in examples from 1 to 5 (1)

| Vulcanization (minutes) time | | Modulus 200% (kg/cm$^2$) | | | Tensile strength (kg/cm$^2$) | | | Elongation at break % | | | Tensile Set % | | | Heat development °C | | |
|---|---|---|---|---|---|---|---|---|---|---|---|---|---|---|---|---|
| Sample | Ex. | 15 | 30 | 60 | 15 | 30 | 60 | 15 | 30 | 60 | 15 | 30 | 60 | 15 | 30 | 60 |
| A | 1 | 37 | 59 | 80 | 190 | 280 | 321 | 505 | 480 | 460 | 28 | 20 | 15 | n.d. | 41 | 35 |
| B | 1 | 13 | 25 | 36 | 101 | 200 | 210 | 580 | 560 | 550 | 75 | 40 | 35 | n.d. | n.d. | n.d. |
| C | 1 | 19 | 32 | 38 | 119 | 183 | 205 | 550 | 525 | 515 | 65 | 38 | 31 | n.d. | n.d. | n.d. |
| D | 2 | 35 | 58 | 78 | 181 | 275 | 305 | 480 | 465 | 440 | 35 | 24 | 19 | n.d. | 44 | 41 |
| E | 2 | 22 | 38 | 41 | 139 | 167 | 203 | 520 | 490 | 485 | 49 | 36 | 29 | n.d. | 57 | 46 |
| F | 3 | 30 | 47 | 59 | 149 | 218 | 281 | 510 | 495 | 480 | 36 | 28 | 21 | n.d. | 46 | 43 |
| G | 3 | 22 | 31 | 40 | 130 | 175 | 208 | 560 | 545 | 530 | 50 | 37 | 35 | n.d. | 57 | 45 |
| H | 4 | 32 | 48 | 61 | 160 | 220 | 280 | 550 | 515 | 495 | 38 | 30 | 25 | n.d. | 43 | 42 |
| I | 4 | 10 | 19 | 26 | 88 | 145 | 180 | 605 | 580 | 560 | 65 | 60 | 55 | n.d. | n.d. | n.d. |
| L | 5 | 35 | 55 | 68 | 170 | 265 | 305 | 495 | 480 | 465 | 30 | 23 | 19 | n.d. | 42 | 37 |
| M | 5 | 15 | 24 | 45 | 102 | 250 | 255 | 540 | 560 | 550 | 45 | 35 | 30 | n.d. | n.d. | 48 |

NOTE- n.d. = it is not determined because of breaking of specimen during the test (1) The vulcanization recipe is reported in example 1.

UNITED STATES PATENT AND TRADEMARK OFFICE
CERTIFICATE OF CORRECTION

PATENT NO. : 3,903,062

Page 3 of 3

DATED : September 2, 1975

INVENTOR(S) : Sergio Arrighetti, et al

It is certified that error appears in the above–identified patent and that said Letters Patent are hereby corrected as shown below:

SECTION 2

Technological properties of co-vulcanized products obtained from mixtures at 75 : 25 of tetrapolymers (or terpolymers) and polyisoprene described in examples 1 - 5 (1)

| Sample | Ref. ex. | Modulus 200% (kg/cm²) | | | Tensile strength (kg/cm²) | | | Elongation at break % | | | Tensile set % | | | Heat development °C | | |
|---|---|---|---|---|---|---|---|---|---|---|---|---|---|---|---|---|
| Vulcanization time (minutes) | | 15 | 30 | 60 | 15 | 30 | 60 | 15 | 30 | 60 | 15 | 30 | 60 | 15 | 30 | 60 |
| A | 1 | 35 | 52 | 61 | 155 | 175 | 225 | 590 | 535 | 485 | 33 | 24 | 16 | n.d. | 43 | 38 |
| B | 1 | 12 | 22 | 25 | 33 | 48 | 60 | 970 | 790 | 650 | 50 | 45 | 45 | n.d. | n.d. | n.d. |
| C | 1 | 17 | 33 | 35 | 68 | 88 | 110 | 820 | 700 | 615 | 47 | 40 | 38 | n.d. | n.d. | n.d. |
| D | 2 | 33 | 54 | 65 | 150 | 190 | 240 | 600 | 580 | 495 | 31 | 25 | 21 | 49 | 45 | 42 |
| E | 2 | 22 | 30 | 35 | 95 | 124 | 150 | 670 | 595 | 580 | 42 | 37 | 31 | n.d. | 53 | 47 |
| F | 3 | 25 | 43 | 46 | 101 | 129 | 153 | 570 | 515 | 495 | 43 | 36 | 30 | n.d. | 51 | 45 |
| G | 3 | 20 | 32 | 37 | 59 | 77 | 103 | 710 | 605 | 550 | 53 | 45 | 37 | n.d. | n.d. | n.d. |
| H | 4 | 30 | 39 | 44 | 68 | 117 | 145 | 595 | 555 | 530 | 51 | 48 | 37 | n.d. | 49 | 45 |
| I | 4 | 11 | 20 | 22 | 18 | 28 | 36 | 990 | 820 | 790 | 75 | 68 | 60 | n.d. | n.d. | n.d. |
| L | 5 | 29 | 49 | 55 | 109 | 168 | 200 | 605 | 555 | 490 | 36 | 27 | 22 | 53 | 46 | 39 |
| M | 5 | 10 | 23 | 30 | 33 | 50 | 58 | 900 | 805 | 620 | 70 | 40 | 39 | n.d. | n.d. | 50 |

NOTE: n.d. = it is not determinable (1) The vulcanization recipe is reported in example 1.

Signed and Sealed this

Twenty-fourth Day of January 1978

[SEAL]

Attest:

RUTH C. MASON
Attesting Officer

LUTRELLE F. PARKER
Acting Commissioner of Patents and Trademarks